(12) United States Patent
Manoonpong et al.

(10) Patent No.: US 12,510,903 B2
(45) Date of Patent: Dec. 30, 2025

(54) METHOD AND SYSTEM FOR CONTROLLING MOTION OF A CLIMBING ROBOT

(71) Applicant: PTT EXPLORATION AND PRODUCTION PUBLIC COMPANY LIMITED, Bangkok (TH)

(72) Inventors: Poramate Manoonpong, Rayong (TH); Arthicha Srisuchinnawong, Rayong (TH); Kitti Phongaksorn, Rayong (TH); Wasuthorn Ausrivong, Rayong (TH); Thutchai Kasemwarapach, Bangkok (TH); Pong Kosanant, Bangkok (TH)

(73) Assignee: PTT EXPLORATION AND PRODUCTION PUBLIC COMPANY LIMITED, Bangkok (TH)

( * ) Notice: Subject to any disclaimer, the term of this patent is extended or adjusted under 35 U.S.C. 154(b) by 69 days.

(21) Appl. No.: 18/705,447

(22) PCT Filed: Oct. 29, 2021

(86) PCT No.: PCT/IB2021/060011
§ 371 (c)(1),
(2) Date: Apr. 26, 2024

(87) PCT Pub. No.: WO2023/073412
PCT Pub. Date: May 4, 2023

(65) Prior Publication Data
US 2024/0385622 A1 Nov. 21, 2024

(51) Int. Cl.
*G05D 1/222* (2024.01)
*B62D 57/024* (2006.01)
(Continued)

(52) U.S. Cl.
CPC .......... *G05D 1/222* (2024.01); *B62D 57/024* (2013.01); *B62D 57/032* (2013.01);
(Continued)

(58) Field of Classification Search
CPC ............ G05D 1/22; G05D 1/606; G05D 1/65; G05D 1/2287; B62D 7/024; B62D 7/032
(Continued)

(56) References Cited

U.S. PATENT DOCUMENTS 7,996,112 B1 * 8/2011 Behar .................. B62D 57/032
700/258
11,781,698 B2 * 10/2023 Fekrmandi .......... B62D 57/032
180/8.6
(Continued)

*Primary Examiner* — Yazan A Soofi
(74) *Attorney, Agent, or Firm* — Womble Bond Dickinson (US) LLP

(57) ABSTRACT

An aspect of this invention relates to a method for controlling motion of a climbing robot comprising the steps of receiving high-level commands; receiving sensory feedbacks comprising roll angle data; generating basic locomotion pattern signals based on received high-level commands; amplifying the generated basic locomotion pattern signals based on received high-level commands; adapting the basic locomotion pattern signals to obtain adaptation commands; generating motor commands based on received high-level commands, obtained adaptation command, and amplified basic locomotion pattern signals to drive a plurality of joint motors of the robot; and generating electromagnet activate signals based on received high-level commands and generated basic locomotion pattern signals. Another aspect of the invention relates to a system for controlling motion of the climbing robot, which comprises a sensory preprocessing module, a central pattern generator, a velocity regulating module, an adaptation module, a joint motor angle determine module, and an electromagnet activate module.

39 Claims, 2 Drawing Sheets

(51) Int. Cl.
    *B62D 57/032*     (2006.01)
    *G05D 1/228*     (2024.01)
    *G05D 1/606*     (2024.01)
    *G05D 1/65*     (2024.01)

(52) U.S. Cl.
    CPC ........... *G05D 1/2287* (2024.01); *G05D 1/606* (2024.01); *G05D 1/65* (2024.01)

(58) Field of Classification Search
    USPC .......................................................... 701/1
    See application file for complete search history.

(56) References Cited

U.S. PATENT DOCUMENTS

| | | | |
|---|---|---|---|
| 2015/0265125 A1* | 9/2015 | Lee ..................... | A47L 11/4061 |
| | | | 701/26 |
| 2016/0271803 A1* | 9/2016 | Stewart ................ | B25J 11/0085 |
| 2020/0198713 A1* | 6/2020 | Jiang ....................... | B62D 55/30 |
| 2021/0041887 A1* | 2/2021 | Whitman ................ | B25J 13/089 |
| 2024/0351649 A1* | 10/2024 | Pewkliang ........... | B62D 57/032 |

\* cited by examiner

METHOD AND SYSTEM FOR CONTROLLING MOTION OF A CLIMBING ROBOT

CROSS-REFERENCE TO RELATED APPLICATIONS

This application is a national stage of International Application No. PCT/IB2021/060011, filed on Oct. 29, 2021, the disclosure of which is incorporated herein by reference in its entirety.

FIELD OF THE INVENTION

An engineering in the field of a method and system for controlling motion of a climbing robot.

BACKGROUND OF THE INVENTION

There are types of climbing robots being used in a wide variety of tasks for various purposes, for example, surveying sites or inspect malfunctions of various industrial equipment, e.g., pipeline or cable. Among types of climbing robots, the robots that can walk or slide along the surface by stretching and dragging their body is popular as they can be designed to be compact, lightweight, and require minimal hardware for its development in comparison to other robots. However, most of the limitations of such a type of robot are the instability of its body while moving and poor adaptability in whatever surfaces it encounters. The said limitations can cause serious problems in the robot's operation, such as malfunctions in the task or robot's damages caused by falling from a height. Those limitations sometimes cause by the movement control method/system of the robot that is not efficient enough. As a result, there is a need for the controlling methods and systems that have been improved for better locomotion of the robot.

The following prior arts show examples of the methods and systems which have been developed to improve the controlling motion of the climbing robots.

The research paper entitled "iCrawl: An Inchworm-Inspired Crawling Robot". IEEE Access, Volume 8. Nov. 4, 2020. Pages 200655-200668 discloses a state-machine based controller developed to produce the required motor signals for the two inchworm-inspired crawling gaits: i) the step gait, and ii) the sliding gait. Both gaits were tested on the robot, eventually leading to effectively crawling on the pipes and flat surfaces, climbing a metal wall and a pipe, and succeeding in obstacle avoidance during crawling. However, this research paper does not disclose about controlling the twist joints of the robot body. For this reason, the balance adjustment may be unsatisfactory.

The research paper entitled "Neural control and adaptive neural forward models for insect-like, energy-efficient, and adaptable locomotion of walking machines". ORIGINAL RESEARCH article, Volume 7. Article 12. Feb. 13, 2013, discloses adaptive neural locomotion control consisting of a central pattern generator (CPG) mechanism with neuromodulation and local leg control mechanisms based on sensory feedback and adaptive neural forward models with efference copies. This neural closed-loop controller enables a walking machine to perform a multitude of different walking patterns including insect-like leg movements and gaits as well as energy-efficient locomotion. Also, this research paper does not disclose about controlling the body joints for turning and balancing of the robot.

Chinese patent publication no. CN 106826831 A discloses a walking robot control system comprising a walking foot, and adsorption foot, a first steering engine, a second steering engine, a third steering engine, a fourth steering engine, a fifth steering engine, a first connecting rod, a second connecting rod, and a controller. The robot further comprises battery suction cups arranged at the bottoms thereof and the adsorption foot. The controller controls whether the battery suction cups are adsorbed on the wall surface of a rigid structure by controlling the on-off electricity of a relay. The first steering engine is arranged at the joint of the walking foot for controlling the self-rotation angle and direction of the walking foot. The second steering engine is arranged at the joint of the walking foot and the first connecting rod for controlling the relative rotation of the walking foot and the first connecting rod. The third steering engine is arranged at the joint of the first connecting rod and the second connecting rod for controlling the relative rotation of the first connecting rod and the second connecting rod. The fourth steering engine is arranged at the joint of the second connecting rod and the adsorption foot and used for controlling the relative rotation of the second connecting rod and the adsorption foot. The controller can realize the walking of the walking foot or the adsorption foot on the wall surface by controlling the second steering engine, the third steering engine, and the fourth steering engine. The fifth steering engine is arranged on the adsorption foot and used for controlling the travel. The first connecting rod, the second connecting rod, and the adsorption foot integrally rotate relative to each other.

Apart from the above arts, there is still a need to develop a method and system for controlling the motion of a climbing robot. Especially, the control method and system that can leverage the robot's locomotion for it to move on various surface effectively and stably.

SUMMARY OF THE INVENTION

The present invention aims to improve a method and system for controlling the motion of a climbing robot, especially the robot having components including a plurality of legs and joint motors connected in series to be stretched and dragged when moving, such that the robot can adapt its motion, e.g., the balance or rotation of its body, based on high-level commands and sensory feedbacks to climb through difference surface, such as a narrow surface or a curved surface.

In one aspect, the present invention relates to a method for controlling motion of a climbing robot. The method comprises the steps of:

(A) receiving high-level commands from an operator by a sensory preprocessing module of a controller, (B) receiving sensory feedbacks comprising roll angle data from an IMU sensor installed at a body of the robot by the sensory preprocessing module of the controller, (C) generating basic locomotion pattern signals based on received high-level commands by a central pattern generator (CPG) of the controller to cause robot's components including a plurality of legs, feet, bodies, and joint motors connected in series to be stretched and dragged, (D) amplifying the generated basic locomotion pattern signals based on received high-level commands by a velocity regulating module of the controller, (E) adapting the basic locomotion pattern signals to obtain adaptation commands based on received high-level commands, received sensory feedbacks, and generated basic locomotion pattern signals to adapt the locomotion of the robot by an adaptation module of the controller, (F) generating motor commands based on received high-level commands, obtained adaptation commands, and amplified basic locomotion pattern signals to drive a plurality of joint motors comprising a back foot twist motor, a back leg upward/downward rotating motor, a back/front body upward/downward rotating motor, a front body twist motor, a front leg upward/downward rotating motor, and a front foot twist motor by a joint motor angle determine module of the controller, and (G) generating electromagnet activate signals of the back foot and the front foot of the robot based on received high-level commands and generated basic locomotion pattern signals by an electromagnet activate module.

Another aspect of the present invention relates to a system for controlling motion of a climbing robot. The system comprises:

a sensory preprocessing module of a controller configured to receive high-level commands from an operator and to receive sensory feedbacks comprising roll angle data from an IMU sensor installed at a body of the robot, a central pattern generator (CPG) of the controller configured to generate basic locomotion pattern signals based on received high-level commands to cause robot's components including a plurality of legs, feet, bodies, and joint motors connected in series to be stretched and dragged, a velocity regulating module of the controller configured to amplify generated basic locomotion pattern signals based on received high-level commands, an adaptation module of the controller configured to adapt the basic locomotion pattern signals to obtain adaptation commands based on received high-level commands, received sensory feedbacks, and generated basic locomotion pattern signals to adapt the locomotion of the robot, a joint motor angle determine module of the controller configured to generate motor commands based on received high-level commands, obtained adaptation commands, and amplified basic locomotion pattern signals to drive a plurality of joint motors comprising a back foot twist motor, a back leg upward/downward rotating motor, a back/front body upward/downward rotating motor, a front body twist motor, a front leg upward/downward rotating motor, and a front foot twist motor, and an electromagnet activate module configured to generate electromagnet activate signals of the back foot and the front foot of the robot based on received high-level commands and generated basic locomotion pattern signals.

DETAILED DESCRIPTION OF THE INVENTION

The method and system for controlling motion of the climbing robot according to the present invention will now be described by the following details with reference to the accompanying figures.

Any aspects represented herein shall mean to include the application with other aspects of this invention unless it has been specified otherwise.

All technical terms used herein have the meaning that will be understood by those ordinary skilled in the art unless it has been defined otherwise.

Use of singular nouns or pronouns when used with "comprising" in claims and/or specification means "one" and will also include "one or more", "at least one", and "one or more than one".

The terms "comprise", "has/have" and "include" are open-ended verbs, wherein one or more of these verb formats, for example "comprise", "comprising", "has/have", "having", "include", "including" are also open-ended verbs. For example, any method that "comprises", "has" or "includes" one step or more does not limit to one step or steps but also covers the steps that has not been indicated.

Any instrument, equipment or method mentioned herein, unless indicated otherwise, shall mean instrument, equipment or that are generally used or practiced by a person skilled in the art of this field.

Figure 1:
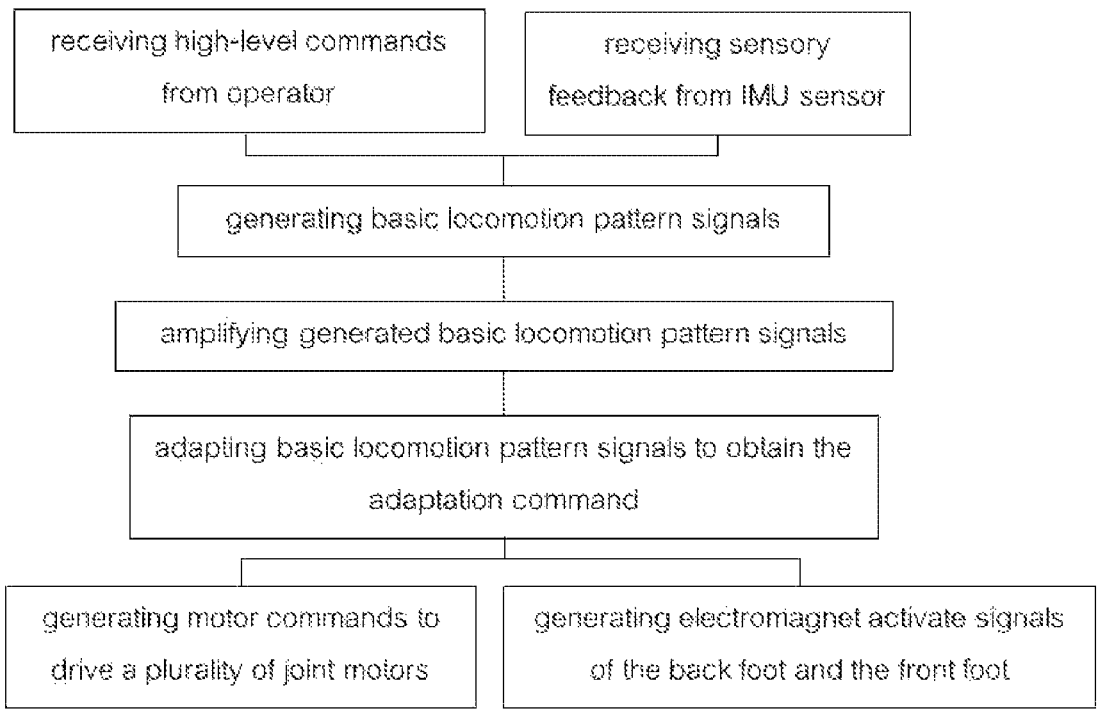
FIG. 1 is a diagram showing the steps of the method for controlling motion of the climbing robot according to the present invention.

Referring now to FIG. 1, the method for controlling motion of the climbing robot of the present invention comprises the steps of:

(A) receiving high-level commands being the variable that determines the basic locomotion pattern of the robot from an operator by a sensory preprocessing module of a controller, (B) receiving sensory feedbacks comprising roll angle data from an IMU sensor installed at a body of the robot by the sensory preprocessing module of the controller to cause the controller to recognize the tilt status of the robot, (C) generating basic locomotion pattern signals based on received high-level commands by a central pattern generator (CPG) of the controller to cause robot's components including a plurality of legs, feet, bodies, and joint motors connected in series to be stretched and dragged, (D) amplifying the generated basic locomotion pattern signals based on received high-level commands by a velocity regulating module of the controller, (E) adapting the basic locomotion pattern signals to obtain adaptation commands based on received high-level commands, received sensory feedbacks, and generated basic locomotion pattern signals to adapt the locomotion of the robot by an adaptation module of the controller, (F) generating motor commands based on received high-level commands, obtained adaptation commands, and amplified basic locomotion pattern signals to drive a plurality of joint motors comprising a back foot twist motor, a back leg upward/downward rotating motor, a back/front body upward/downward rotating motor, a front body twist motor, a front leg upward/downward rotating motor, and a front foot twist motor by a joint motor angle determine module of the controller, and (G) generating electromagnet activate signals of the back foot and the front foot of the robot based on received high-level commands and generated basic locomotion pattern signals by an electromagnet activate module.

The robot's components according to the present invention include a plurality of legs and joint motors connected in series to be stretched and dragged enable the robot to climb well on the surfaces with various environments even on the surfaces that are difficult to climb, e.g., the narrow surface or curved surface.

According to step (E), adapting the basic locomotion pattern signals to obtain adaptation commands allows the robot to adjust its posture and movement to increase the efficiency of movement, that is, the robot can move better on various surfaces, such as the curved surface or the inclined surface. For example, when the robot climbs on the pipe and a tilt occurs, such tilt is detected by the IMU sensor, and the detected sensory feedback is sent to the sensory preprocessing module so that a plurality of joint motors of the robot is controlled to turn or balance its body until it returns to a normal condition.

For step (F), generating motor commands to drive the back leg upward/downward rotating motor, the back/front body upward/downward rotating motor, and the front leg upward/downward rotating motor allow the robot to be stretched and dragged. Further, generating motor commands to drive the back foot twist motor, the front body twist motor, and the front foot twist motor allows the robot to turn or adapt the motion.

For step (G), generating electromagnet activate signals allows the back foot and the front foot to be attached and removed to the metal surface where the robot is climbing.

According to the present invention, examples of the high-level commands may comprise a speed, a frequency, an autonomous/manual adaptation selection, a manual steering command, and inspection parameters. Examples of the inspection parameters may comprise an offset degree of the foot based on a moving direction that the foot is moving and a lifting height of the foot. For example, if the foot of the robot will move to a position that is tilted 30 degrees from the center line of the pipe, the offset degree of the foot based on a moving direction is 30 degrees.

In one exemplary embodiment, receiving high-level commands from the operator can be performed by using a joystick. However, receiving high-level commands may be performed using other input device, such as computer or laptop.

In a preferred embodiment of this invention, the frequency is processed by the CPG to generate basic locomotion pattern signals. In this way, increasing or decreasing stretching/stride frequency can be controlled. The speed is processed by the velocity regulating module to amplify the generated basic locomotion pattern signals, such that increasing or decreasing the stretching/stride length can be controlled. And, the autonomous/manual adaptation selection, the manual steering commands, and the inspection parameters are processed by the adaptation module to adapt the basic locomotion pattern signals.

According to the present invention, the inspection parameters are processed by the joint motor angle determine module to generate motor commands. Further, the inspection parameters are processed by the electromagnet activate module to generate electromagnet activate signals. The inspection parameters allow noise in signal of high-level commands from an operator to be reduced, thus the robot's motion is more stable.

The robot's components of the present invention comprise a back foot, a back leg connected to the back foot via the back foot twist motor, a back body connected to the back leg via the back leg upward/downward rotating motor, a first front body connected to the back body via the back/front body upward/downward rotating motor, a second front body connected to the first front body via the front body twist motor, a front leg connected to the second front body via the front leg upward/downward rotating motor, and a front foot connected to the front leg via the front foot twist motor.

According to the above configuration, the robot's components are controlled by the method according to the present invention allows the robot to move more efficiently and to adjust its movement to suit the surfaces where it is moving. Further, the robot can adjust the movement to suit the environment or problems encountered during the movement. This configuration of the robot's components enables the posture of the robot to adjust such that the robot has six degrees of freedom (6-DOF) which allow the robot to adjust its posture freely in a spherical workspace of radius.

The method according to the present invention may further comprise a step of receiving sensory feedbacks comprising obstacle detect data from IR sensors installed at each foot of the robot by the sensory preprocessing module of the controller. The method may further comprise a step of creating obstacle crossing signals based on received high-level commands by an obstacle crossing processing module of the controller.

In a preferred embodiment, the high-level commands may further comprise obstacle crossing trigger commands, thereby the obstacle crossing trigger commands are processed by the obstacle crossing processing module to create the obstacle crossing signal.

The method according to the present invention may further comprise a step of forming an obstacle crossing signal pattern, based on created obstacle crossing signals, to be sent to the joint motor angle determine module by a pattern formation module of the controller.

According to the above configuration, forming the obstacle crossing signal pattern for the joint motor angle determine module improves the efficiency of the robot's climbing in such a way that it allows a plurality of joint motors of the robot to be controlled to make the robot cross obstacles, such as pipe flanges. For example, when the robot faces the obstacle, the obstacle crossing trigger command is triggered, the robot will lift the front leg and swing it over the obstacle. Then, the robot will lift the back leg and swing it over the obstacle.

The method according to the present invention may further comprise a step of creating transition signals based on received high-level commands by a transition processing module of the controller.

According to the preferred embodiment, the high-level commands further comprise transition trigger commands and transition parameters. The transition trigger commands, and transition parameters are processed by the transition processing module to create the transition signal. Examples of the transition parameters may comprise a stretch length of the foot and an offset degree of the foot based on a plane that the foot is placed.

The method according to the present invention may further comprise a step of forming transition signal patterns, based on created transition signals, to be sent to the joint motor angle determine module by a pattern formation module of the controller.

According to the above configuration, forming the transition signal patterns for the joint motor angle determine module improves the efficiency of the robot's climbing in such a way that it allows a plurality of joint motors of the robot to be controlled to make the robot transition from one plane into another plane, such as the transition from a horizontal pipe into a vertical pipe. For example, when the robot is on one pipe and the transition trigger commands are triggered, the robot will lift the front leg and stretch it toward another pipe. After the front leg reaches the pipe, the front electromagnet attaches, then the robot will transverse to the regular configuration to land fully on another pipe.

Another aspect of the present invention relates to the system for controlling motion of the climbing robot.

Figure 2:
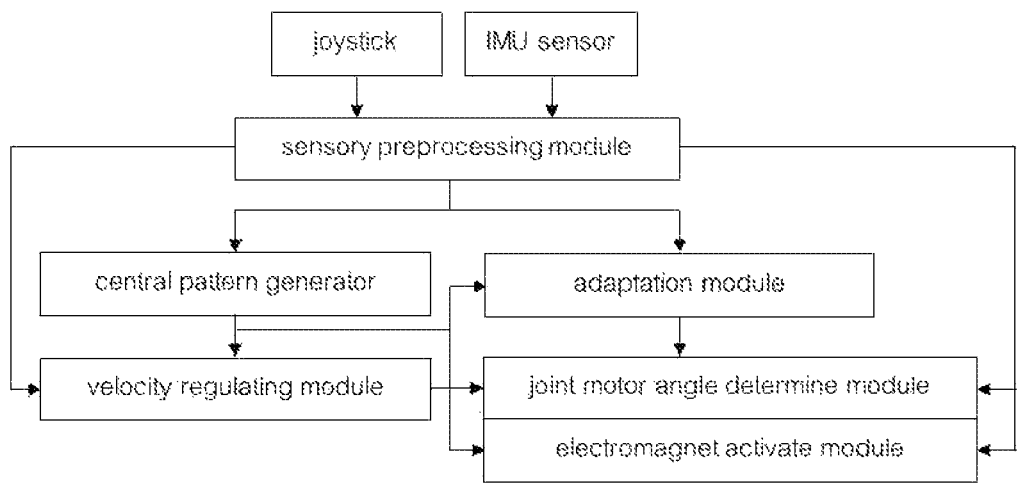
FIG. 2 is a diagram showing an exemplary embodiment of the system for controlling motion of the climbing robot according to the present invention.

Referring now to FIG. 2, the system for controlling motion of the climbing robot according to an exemplary embodiment of the present invention comprising:

a sensory preprocessing module of a controller configured to receive high-level commands from an operator and to receive sensory feedbacks comprising roll angle data from an IMU sensor installed at a body of the robot, a central pattern generator (CPG) of the controller configured to generate basic locomotion pattern signals based on received high-level commands to cause robot's components including a plurality of legs, feet, bodies, and joint motors connected in series to be stretched and dragged, a velocity regulating module of the controller configured to amplify generated basic locomotion pattern signals based on received high-level commands, an adaptation module of the controller configured to adapt the basic locomotion pattern signals to obtain adaptation commands based on received high-level commands, received sensory feedbacks, and generated basic locomotion pattern signals to adapt the locomotion of the robot, a joint motor angle determine module of the controller configured to generate motor commands based on received high-level commands, obtained adaptation commands, and amplified basic locomotion pattern signals to drive a plurality of joint motors comprising a back foot twist motor, a back leg upward/downward rotating motor, a back/front body upward/downward rotating motor, a front body twist motor, a front leg upward/downward rotating motor, and a front foot twist motor, and an electromagnet activate module configured to generate electromagnet activate signals of the back foot and the front foot of the robot based on received high-level commands and generated basic locomotion pattern signals.

The controller suitable for this invention may be a neural controller having a neural network used to receive high-level commands from the operator and sensory feedback from the sensor (e.g., IMU sensor), and generate motor commands and electromagnet activate signals.

According to this invention, the stretching phase means the robot stretches and activates only the electromagnet of the back foot. The dragging phase means the robot activates only the electromagnet of the front foot and contracts to drag its body forward.

According to the preferred embodiment, the joint motors of the robot are servo motors.

Examples of the high-level commands according to the present invention comprise a speed, a frequency, an autonomous/manual adaptation selection, a manual steering command, and inspection parameters. From above, the inspection parameters may comprise an offset degree of the foot based on a moving direction that the foot is moving, and a lifting height of the foot.

The system of this invention may further comprise a joystick used to supply the high-level commands from the operator to the sensory preprocessing module.

According to a preferred embodiment, the frequency is processed by the central pattern generator to generate basic locomotion pattern signals. For example, when the frequency is set higher, the stretching/stride frequency of the robot increases accordingly. The speed is processed by the velocity regulating module to amplify the generated basic locomotion pattern signals. For example, when the speed is set higher, the stretching/stride length of the robot increases accordingly. Accordingly, the robot can move faster.

Yet a preferred embodiment of the present invention, the autonomous/manual adaptation selection, the manual steering commands, and the inspection parameters are processed by the adaptation module to adapt the basic locomotion pattern signals. The inspection parameters are processed by the joint motor angle determine module to generate motor commands. And the inspection parameters are processed by the electromagnet activate module to generate electromagnet activate signals.

The robot's components may comprise a back foot, a back leg connected to the back foot via the back foot twist motor, a back body connected to the back leg via the back leg upward/downward rotating motor, a first front body connected to the back body via the back/front body upward/downward rotating motor, a second front body connected to the first front body via the front body twist motor, a front leg connected to the second front body via the front leg upward/downward rotating motor, and a front foot connected to the front leg via the front foot twist motor.

Figure 3:
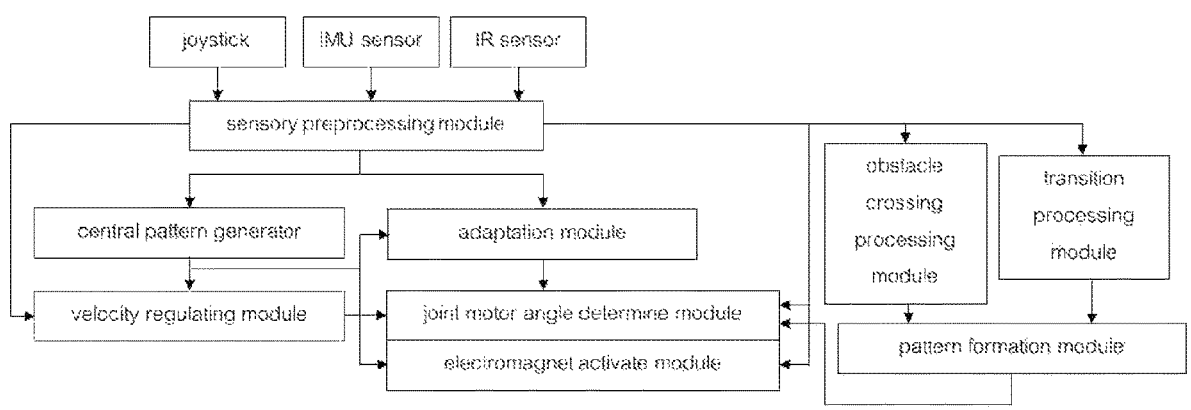
FIG. 3 is a diagram showing another exemplary embodiment of the system for controlling motion of the climbing robot according to the present invention.

Referring now to FIG. 3 of the diagram showing another exemplary embodiment of the system of this invention, the sensory preprocessing module of the controller is configured to receive the sensory feedbacks comprising obstacle detect data from IR sensors installed at each foot of the robot.

According to a preferred embodiment, the system may further comprise an obstacle crossing processing module of the controller configured to create obstacle crossing signals based on received high-level commands. The high-level commands may further comprise obstacle crossing trigger commands. The obstacle crossing trigger commands are processed by the obstacle crossing processing module to create obstacle crossing signals.

As shown in FIG. 3, the system may further comprise a transition processing module of the controller configured to create transition signals based on received high-level commands.

In one embodiment, the high-level commands may further comprise transition trigger commands and transition parameters, wherein the transition trigger commands, and transition parameters are processed by the transition processing module to create the transition signal. Examples of the transition parameters may comprise a stretch length of the foot and an offset degree of the foot based on a plane that the foot is placed.

According to another preferred embodiment, the system may further comprise a pattern formation module of the controller configured to form obstacle crossing signal patterns, based on created obstacle crossing signals, to be sent to the joint motor angle determine module, and/or to form transition signal patterns, based on created transition signals, to be sent to the joint motor angle determine module by the pattern formation module of the controller.

The method and system according to this invention allow the robot to adapt its movement for turning and balancing its body. This results in efficient locomotion of the robot in various environments, for example, curve surface, uneven surface, and tilt surface. Accordingly, the locomotion control method and system of this invention can increase robot's agility for real-world applications, such as planetary/space exploration and search and rescue, for which autonomous mobile robots with versatile and reliable locomotion and continuous adaptation are in high demand.

The method and system disclosed and claimed in this application are intended to cover aspects of the invention obtained from performing, operating, modifying, changing any factors without experimentations that are significantly different from this invention, and acquire the same which have utilities, advantages, and results similar to the aspects of the present invention according to those ordinary skilled in the art even without being indicated in claims specifically. Therefore, the substitution for or similarity to the aspects of the present invention including minor modification or change that can be apparent to a person skilled in the art in this field shall be considered under the intention, concept, and scope of this invention as appeared in the appended claims.

BEST MODE OF THE INVENTION

Best mode of the invention is as described in the detailed description of the invention.

The invention claimed is:

1. A method for controlling motion of a climbing robot, the method comprising the steps of:
   (A) receiving high-level commands from an operator by a sensory preprocessing module of a controller;
   (B) receiving sensory feedbacks comprising roll angle data from an IMU sensor installed at a body of the robot by the sensory preprocessing module of the controller;
   (C) generating basic locomotion pattern signals based on received high-level commands by a central pattern generator (CPG) of the controller to cause the robot's components including a plurality of legs, feet, bodies, and joint motors connected in series to be stretched and dragged;
   (D) amplifying the generated basic locomotion pattern signals based on received high-level commands by a velocity regulating module of the controller;
   (E) adapting the basic locomotion pattern signals to obtain adaptation commands based on received high-level commands, received sensory feedbacks, and generated basic locomotion pattern signals to adapt the locomotion of the robot by an adaptation module of the controller;
   (F) generating motor commands based on received high-level commands, obtained adaptation commands, and amplified basic locomotion pattern signals to drive a plurality of joint motors comprising a back foot twist motor, a back leg upward/downward rotating motor, a back/front body upward/downward rotating motor, a front body twist motor, a front leg upward/downward rotating motor, and a front foot twist motor by a joint motor angle determine module of the controller; and
   (G) generating electromagnet activate signals of the back foot and the front foot of the robot based on received high-level commands and generated basic locomotion pattern signals by an electromagnet activate module.

2. The method according to claim 1, wherein the high-level commands comprise a speed, a frequency, an autonomous/manual adaptation selection, a manual steering command, and inspection parameters.

3. The method according to claim 2, wherein the inspection parameters comprise an offset degree of the foot based on a moving direction that the foot is moving, and a lifting height of the foot.

4. The method according to claim 1, wherein receiving high-level commands from the operator is performed by using a joystick.

5. The method according to claim 2, wherein the frequency is processed by the central pattern generator to generate basic locomotion pattern signals.

6. The method according to claim 2, wherein the speed is processed by the velocity regulating module to amplify the generated basic locomotion pattern signals.

7. The method according to claim 2, wherein the autonomous/manual adaptation selection, the manual steering command, and the inspection parameters are processed by the adaptation module to adapt the basic locomotion pattern signals.

8. The method according to claim 2, wherein the inspection parameters are processed by the joint motor angle determine module to generate motor commands.

9. The method according to claim 2, wherein the inspection parameters are processed by the electromagnet activate module to generate electromagnet activate signals.

10. The method according to claim 1, wherein the robot's components comprise a back foot, a back leg connected to the back foot via the back foot twist motor, a back body connected to the back leg via the back leg upward/downward rotating motor, a first front body connected to the back body via the back/front body upward/downward rotating motor, a second front body connected to the first front body via the front body twist motor, a front leg connected to the second front body via the front leg upward/downward rotating motor, and a front foot connected to the front leg via the front foot twist motor.

11. The method according to claim 1, further comprising: receiving sensory feedbacks comprising obstacle detect data from IR sensors installed at each foot of the robot by the sensory preprocessing module of the controller.

12. The method according to claim 1, further comprising: creating obstacle crossing signals based on received high-level commands by an obstacle crossing processing module of the controller.

13. The method according to claim 12, wherein the high-level commands further comprise obstacle crossing trigger commands.

14. The method according to claim 13, wherein the obstacle crossing trigger commands are processed by the obstacle crossing processing module to create the obstacle crossing signals.

15. The method according to claim 12, further comprising: forming an obstacle crossing signal pattern, based on created obstacle crossing signals, to be sent to the joint motor angle determine module by a pattern formation module of the controller.

16. The method according to claim 1, further comprising: creating transition signals based on received high-level commands by a transition processing module of the controller.

17. The method according to claim 16, wherein the high-level commands further comprise transition trigger commands and transition parameters.

18. The method according to claim 17, wherein the transition parameters comprise a stretch length of the foot and an offset degree of the foot based on a plane that the foot is placed.

19. The method according to claim 17, wherein the transition trigger commands, and transition parameters are processed by the transition processing module to create transition signals.

20. The method according to claim 16, further comprising: forming transition signal patterns, based on created transition signals, to be sent to the joint motor angle determine module by a pattern formation module of the controller.

21. A system for controlling motion of a climbing robot, the system comprising:
a sensory preprocessing module of a controller configured to receive high-level commands from an operator and to receive sensory feedbacks comprising roll angle data from an IMU sensor installed at a body of the robot;
a central pattern generator (CPG) of the controller configured to generate basic locomotion pattern signals based on received high-level commands to cause the robot's components including a plurality of legs, feet, bodies, and joint motors connected in series to be stretched and dragged;
a velocity regulating module of the controller configured to amplify generated basic locomotion pattern signals based on received high-level commands;
an adaptation module of the controller configured to adapt the basic locomotion pattern signals to obtain adaptation commands based on received high-level commands, received sensory feedbacks, and generated basic locomotion pattern signals to adapt the locomotion of the robot;
a joint motor angle determine module of the controller configured to generate motor commands based on received high-level commands, obtained adaptation commands, and amplified basic locomotion pattern signals to drive a plurality of joint motors comprising a back foot twist motor, a back leg upward/downward rotating motor, a back/front body upward/downward rotating motor, a front body twist motor, a front leg upward/downward rotating motor, and a front foot twist motor; and
an electromagnet activate module configured to generate electromagnet activate signals of the back foot and the front foot of the robot based on received high-level commands and generated basic locomotion pattern signals.

22. The system according to claim 21, wherein the high-level commands comprise a speed, a frequency, an autonomous/manual adaptation selection, a manual steering command, and inspection parameters.

23. The system according to claim 22, wherein the inspection parameters comprise an offset degree of the foot based on a moving direction that the foot is moving, and a lifting height of foot.

24. The system according to claim 21, further comprising a joystick used to supply the high-level commands from the operator to the sensory preprocessing module.

25. The system according to claim 22, wherein the frequency is processed by the central pattern generator to generate basic locomotion pattern signals.

26. The system according to claim 22, wherein the speed is processed by the velocity regulating module to amplify generated basic locomotion pattern signals.

27. The system according to claim 22, wherein the autonomous/manual adaptation selection, the manual steering command, and the inspection parameters are processed by the adaptation module to adapt the basic locomotion pattern signals.

28. The system according to claim 22, wherein the inspection parameters are processed by the joint motor angle determine module to generate motor commands.

29. The system according to claim 22, wherein the inspection parameters are processed by the electromagnet activate module to generate electromagnet activate signals.

30. The system according to claim 21, wherein the robot's components comprise a back foot, a back leg connected to the back foot via the back foot twist motor, a back body connected to the back leg via the back leg upward/downward rotating motor, a first front body connected to the back body via the back/front body upward/downward rotating motor, a second front body connected to the first front body via the front body twist motor, a front leg connected to the second front body via the front leg upward/downward rotating motor, and a front foot connected to the front leg via the front foot twist motor.

31. The system according to claim 21, wherein the sensory preprocessing module of the controller is configured to receive the sensory feedbacks comprising obstacle detect data from IR sensors installed at each foot of the robot.

32. The system according to claim 21, further comprising an obstacle crossing processing module of the controller configured to create obstacle crossing signals based on received high-level commands.

33. The system according to claim 32, wherein the high-level commands further comprise obstacle crossing trigger commands.

34. The system according to claim 33, wherein the obstacle crossing trigger commands are processed by the obstacle crossing processing module to create obstacle crossing signals.

35. The system according to claim 21, further comprising a transition processing module of the controller configured to create transition signals based on received high-level commands.

36. The system according to claim 35, wherein the high-level commands further comprise transition trigger commands and transition parameters.

37. The system according to claim 36, wherein the transition parameters comprise a stretch length of the foot and an offset degree of the foot based on a plane that the foot is placed.

38. The system according to claim 36, wherein the transition trigger commands, and transition parameters are processed by the transition processing module to create transition signals.

39. The system according to claim 32, further comprising a pattern formation module of the controller configured to form obstacle crossing signal patterns, based on created obstacle crossing signals, to be sent to the joint motor angle determine module, and/or to form transition signal patterns, based on created transition signals, to be sent to the joint motor angle determine module by the pattern formation module of the controller.

* * * * *